United States Patent
Diener

[15] 3,697,108
[45] Oct. 10, 1972

[54] ENERGY ABSORBING BUMPER MOUNT

[72] Inventor: James H. Diener, Lansing, Mich.

[73] Assignee: General Motors Corporation, Detroit, Mich.

[22] Filed: Feb. 25, 1971

[21] Appl. No.: 118,703

[52] U.S. Cl............................293/89, 188/1 C, 293/99
[51] Int. Cl.................................................B60r 19/04
[58] Field of Search............293/1, DIG. 3, 60, 70, 86, 293/89, 99, 101; 188/1 B, 1 C; 213/1 A

[56] References Cited

UNITED STATES PATENTS

| | | | |
|---|---|---|---|
| 3,006,484 | 10/1961 | Pringiers | 213/220 |
| 3,447,833 | 6/1969 | Rice | 297/386 |
| 3,519,301 | 7/1970 | Somnitz | 293/1 |

Primary Examiner—Arthur L. La Point
Assistant Examiner—Robert Saifer
Attorney—W. E. Finken and D. L. Ellis

[57] ABSTRACT

A collision bumper is supported on a vehicle chassis frame for relative longitudinal bodily movement by a pin and slot connection with relative bodily movement being normally rigidly resisted by substantial mechanical friction between the bumper and the chassis frame. A metal strap formed with a single convolution is connected at one end to the bumper and at the other end to the chassis frame. When an impact on the bumper results in a force on the latter of extraordinary magnitude, the frictional resistance to relative bodily movement is overcome and the bumper is forced rearwardly against the friction to effect primary energy absorption. Simultaneously, tensile forces exerted by the bumper on the strap initiate localized plastic deformation thereof to effect secondary energy absorption.

3 Claims, 4 Drawing Figures

PATENTED OCT 10 1972 3,697,108

INVENTOR.
James H. Diener
BY
D.L. Ellis
ATTORNEY

ENERGY ABSORBING BUMPER MOUNT

This invention relates generally to vehicle collision bumpers and in particular to energy absorbing mounts therefor.

The primary feature of this invention is that it provides an improved vehicle collision bumper mount of the mechanical friction energy absorbing type wherein bodily movement of the bumper relative to the vehicle body in response to the impact of forces of extraordinary magnitude on the bumper takes place against uniform resistance of mechanical friction for purposes of effecting primary absorption of the energy imparted to the bumper by the impact. Another feature of this invention resides in the provision in the bumper mount of secondary energy absorbing means including a connecting member mounted between the vehicle body and the bumper such that relative bodily movement of the latter is necessarily accompanied by permanent distortion of the connecting member with consequent additional or secondary energy absorption. Yet another feature of this invention resides in the provision in the secondary energy absorbing means of a strap type connecting member having convolutions intermediate the ends thereof defining a predetermined number of stress concentrations, the strap being attached at respective opposite ends to the vehicle body and to the bumper so that relative bodily movement of the latter effects plastic deformation of the strap at the stress concentrations with the amount and rate of energy absorbed thereby being dependent upon the configuration of the convolutions and the physical characteristics of the strap.

These and other features of this invention will be readily apparent from the following specification and from the drawings wherein.

Figure 1:
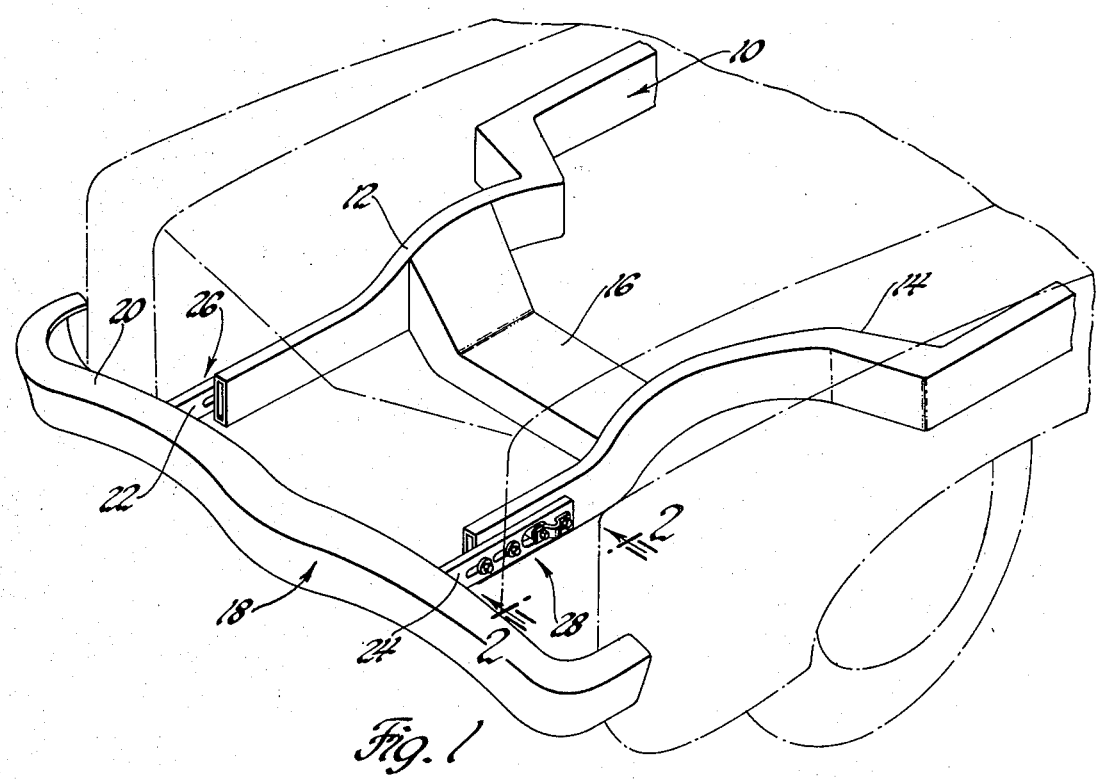
FIG. 1 is a perspective view of an automobile chassis frame having a bumper structure supported thereon by a pair of energy absorbing mounts according to this invention.

Referring now to FIG. 1 of the drawings, there is shown in simplified form an automobile chassis frame designated generally 10 including a pair of longitudinally extending box section frame rails 12 and 14, the frame rails being interconnected at the forward end of the chassis frame by a rigid cross member 16. A collision bumper structure designated generally 18 including a bumper bar 20 having a pair of spaced rigid struts 22 and 24 projecting therefrom is supported on the chassis frame by a pair of energy absorbing mounts according to this invention and designated generally 26 and 28. It will, of course, be understood that the energy absorbing mounts according to this invention while being shown in combination with a separate chassis frame are equally well adapted for employment in unibody constructions.

Except for reversal of orientation, the energy absorbing mounts 26 and 28 are structurally identical and the following discussion is, accordingly, a description of only the mount 28, it being understood that the mounts function identically. As seen best in FIGS. 2, 3 and 4, the strut 24 projecting from the bumper bar 20 has therein a pair of longitudinally spaced slots 30 and 32, an enlarged slot 34 and an aperture 36 with counterbore 38. Each of the slots 30 and 32 slidably receives the shank of a respective one of a pair of threaded studs 40 and 42 rigidly secured by conventional means to frame rail 14 at the forward end thereof. The spaced studs 40 and 42 function, through strut 24, to support the bumper structure 18 on the chassis frame in cantilever fashion and for limited longitudinal bodily movement relative to the latter.

The strut 24 is retained on the chassis frame and restrained against lateral movement relative thereto by a pair of large flat washers 44 and a pair of nuts 46, a respective one of each of the flat washers and nuts being received on each of the studs 40 and 42. In addition to retaining the strut on the chassis frame the nuts and flat washers function as part of the primary energy absorbing means of the mount 28. More particularly, with strut 24 captured between the outboard side of frame rail 14 and the flat washers, tightening of the nuts 46 generates substantial mechanical friction between opposite sides of the strut 24 and the frame rail and flat washers, the magnitude of the mechanical friction, of course, being directly proportional to the torque to which the nuts 46 are subjected. The mechanical friction thus generated resists relative bodily movement of the strut, and hence of the bumper structure, in either direction.

Figure 2:
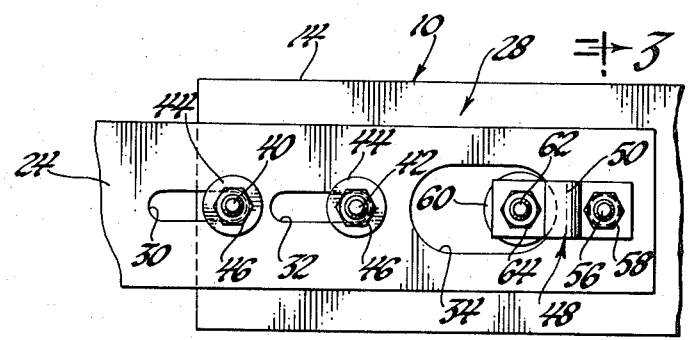
FIG. 2 is a view taken generally along the plane indicated by lines 2—2 in FIG. 1.
Figure 3:
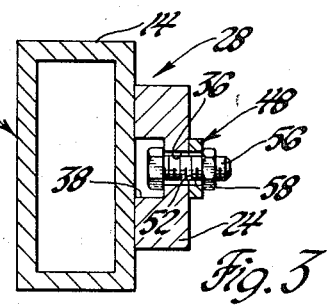
FIG. 3 is an enlarged sectional view taken generally along the plane indicated by lines 3—3 in FIG. 2.

Normally, the bumper structure is supported on the chassis frame 10 in a fully extended position, FIGS. 1 and 2, with the studs 40 and 42 situated at the rearward ends of the corresponding ones of the slots 30 and 32. In addition, the nuts 46 are tightened or torqued down on the studs 40 and 42 an amount sufficient to generate enough mechanical friction between the strut and the frame rail and flat washers to successfully resist relative bodily movement of the bumper structure when the bumper bar is subjected to impact forces below a predetermined magnitude. The value of the predetermined force magnitude is somewhat higher than the magnitude of the most severe force to which the bumper bar might be expected to be subjected during everyday vehicle operation so that the bumper structure is, in effect, normally rigidly supported on the chassis frame.

In an unusual situation, however, as when a collision results in impact forces on the bumper bar of extraordinarily high magnitude, the predetermined force magnitude is very rapidly exceeded. When the predetermined magnitude is exceeded, the mechanical frictional resistance to relative bodily movement is overcome and the strut and entire bumper structure are forced rearwardly relative to the chassis frame against the uniform resistance of the mechanical friction. As the bumper structure so moves, the energy imparted thereto by the abnormally severe impact force is absorbed by the mount 28 in a primary mode and dissipated at a relatively uniform rate as heat generated by friction.

Since the magnitude of the extraordinary impact forces are widely variable and may quite substantially exceed the magnitude required to initiate primary energy absorption, the mount 28 incorporates secondary energy absorbing means which function during primary energy absorption to effect additional or secondary absorption of the energy of impact. As seen best in FIGS. 2, 3 and 4, the secondary means includes a connecting member in the form of a metal strap 48 formed with a single convolution 50 and having a pair of clearance apertures 52 and 54 therein. As seen best in FIG. 3, a bolt 56 is received in aperture 36 in the strut with the head portion thereof seating in counterbore 38. The shank of bolt 56 is received within aperture 52 in the strap 48 and the latter is retained by a nut 58 threadedly received on bolt 56, nut 58 thus functioning to rigidly secure one end of strap 48 to the rearward end of strut 24.

Figure 4:
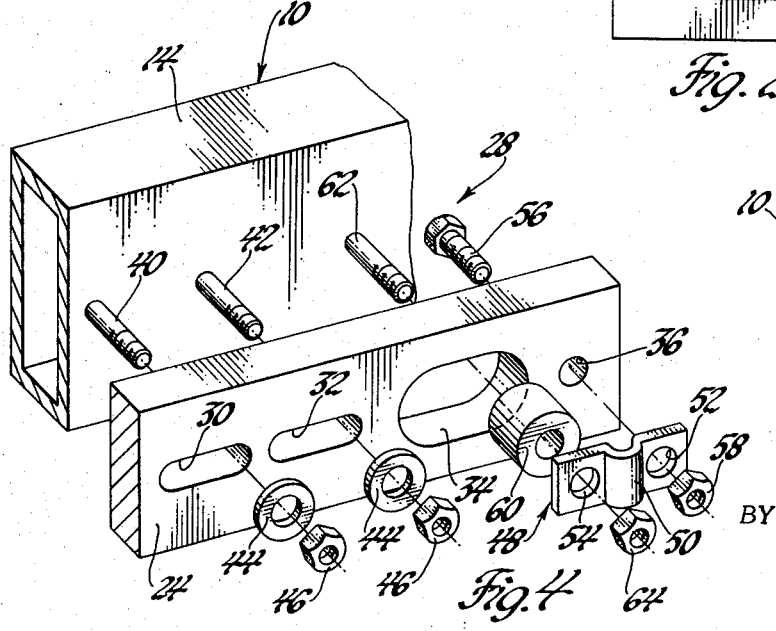
FIG. 4 is an exploded perspective view of an energy absorbing mount according to this invention.

Referring now to FIGS. 2 and 4, a cylindrical spacer member 60 is closely received on the shank of a third threaded stud 62 rigidly affixed to and projecting outboard from frame rail 24. The diameter of the spacer member is less than the width of the enlarged slot 34 in the strut so that when the spacer member is slid down on stud 62 into flush engagement with the outboard surface of frame rail 24, relative bodily movement of the strut is unimpaired. Aperture 54 in strap 48 receives the shank of the third stud 62 outboard of the spacer member 60 and both the strap and spacer member are retained on the stud 62 by a nut 64 threadedly received on the latter, nut 64 thus rigidly attaching the forward end of the strap 48 to the chassis frame.

As seen best in FIG. 2, the position of third stud 62 on the frame rail 24 is predetermined to insure that when the bumper structure 18 is in its normal fully extended position the stud and attached spacer member 60 are situated adjacent the rearward end of enlarged slot 34. Similarly, in the extended position of the bumper structure the strap 48 assumes an initial undistorted and unstressed position.

In a typical energy absorbing cycle of operation of the mount 28, primary energy absorption effected through mechanical friction, as described, is simultaneously accompanied by additional or secondary energy absorption effected through forcible distortion of the strap 48. More particularly, so long as the mechanical frictional resistance to relative bodily movement of the strut maintains the latter rigid, no forces act on the strap. At the instant the predetermined force magnitude necessary to overcome the mechanical friction is exceeded and before relative bodily movement of the strut commences, the strap is subjected by the strut to rapidly increasing tensile forces which forces tend to resist relative bodily movement of the strut. The strap, however, is formed with predetermined areas of stress concentration, as at the base of convolution 50, so that when the tensile forces reach a predetermined value the stress at the concentrations exceeds the elastic limit of the material whereupon localized plastic deformation with consequent secondary energy absorption commences. As the strap distorts the strut moves rearwardly relative to the frame rail against the uniform frictional resistance of the primary energy absorbing means and against the tensile force which must be maintained on the strap to effect forcible distortion thereof. Accordingly, the net energy absorption effected is the sum of that effected by the primary and secondary means, the former being uniform and the latter being variable in accordance with configuration and physical characteristics of the strap.

It will be apparent to those skilled in the art that while the strap 48 with single convolution 50 shown effects secondary energy absorption at a uniform rate, other configurations are possible by which the resisting force exerted on the strut, and hence the secondary energy absorption, vary in proportion to the displacement of the strut relative to the vehicle body. It will be further apparent that after the cessation of energy absorbing operation the mount 28 can be easily and quickly reset for another cycle by removing the distorted strap 48, loosening nuts 46 to permit manual return of the bumper structure to the extended position, reattaching a new undistorted strap between the strut and the frame rail, and retightening nuts 46. Finally, the terms primary energy absorption and secondary energy absorption as used herein are intended to denote only the two modes of energy absorption described and are not intended to reflect on the relative amounts of energy absorbed. Accordingly, either friction or plastic deformation may account for 50 percent more of the total amount of energy absorbed.

Having thus described the invention, what is claimed is:

1. In a vehicle, the combination comprising, a collision bumper structure, a primary energy absorbing means operative to normally rigidly support said bumper structure on said vehicle and to effect absorption of energy imparted to said bumper structure by extraordinary impacts thereon by permitting bodily movement of said bumper structure relative to said vehicle against substantial mechanical frictional resistance, and a secondary energy absorbing means operative simultaneously with said primary means to effect additional absorption of the energy imparted to said bumper structure, said secondary means including a plastically deformable connecting member, means rigidly attaching a first portion of said connecting member to said bumper structure, and means rigidly attaching a second portion of said connecting member to said vehicle so that during relative bodily movement of said bumper structure forces applied to said connecting member by said bumper structure cause energy absorbing plastic deformation of said connecting member.

2. In a vehicle, the combination comprising, a collision bumper structure, a primary energy absorbing means operative to normally rigidly support said bumper structure on said vehicle and to effect absorption of energy imparted to said bumper structure by extraordinary impacts thereon by permitting bodily movement of said bumper structure relative to said vehicle against substantial mechanical frictional resistance, and a secondary energy absorbing means operative simultaneously with said primary means to effect additional absorption of the energy imparted to said bumper structure, said secondary means including a strap having a plurality of convolutions therein defining stress concentrations thereon, means rigidly attaching one end of said strap to said bumper structure, and means rigidly attaching the other end of said strap to said vehicle so that during relative bodily movement of said bumper structure forces applied to said strap by said bumper structure cause stresses at said stress concentrations which exceed the elastic limit of the material of said strap and thereby effect localized energy absorbing plastic deformation of the latter.

3. In a vehicle, the combination comprising, a collision bumper structure including a rigid strut having an enlarged aperture therein, means supporting said rigid strut on said vehicle for longitudinal bodily movement relative to the latter, means on said vehicle and on said strut operative to develop substantial mechanical friction therebetween, said mechanical friction normally maintaining said strut and said bumper structure rigid with respect to said vehicle and providing uniform resistance to relative bodily movement of said bumper structure and said strut to effect absorption of energy imparted to said bumper structure when the latter is subjected to forces of magnitude sufficient to overcome said frictional resistance and bodily move said bumper structure and said strut relative to said vehicle, a metal strap having a convoluted portion intermediate the ends thereof defining a plurality of areas of stress concentration in the strap, means rigidly attaching one end of said strap to said rigid strut, and means projecting through said enlarged aperture in said rigid strut rigidly attaching the other end of said strap to said vehicle so that bodily movement of said strut relative to said vehicle subjects said strap to tensile forces, said tensile forces upon achieving a predetermined magnitude being operative to generate stresses in said strap at said areas of stress concentration which exceed the elastic limit of the material of said strap and thereby effect localized energy absorbing plastic deformation of the latter.

* * * * *